United States Patent
Sitaram et al.

(10) Patent No.: US 11,659,461 B2
(45) Date of Patent: *May 23, 2023

(54) HANDOVERS BASED ON RACH CAPABILITIES

(71) Applicant: Sprint Spectrum LLC, Overland Park, KS (US)

(72) Inventors: Krishna Sitaram, Chantilly, VA (US); Hemanth Pawar, Brambleton, VA (US); Shilpa Kowdley Srinivas, Brambleton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/568,138

(22) Filed: Jan. 4, 2022

(65) Prior Publication Data

US 2022/0132384 A1    Apr. 28, 2022

Related U.S. Application Data (63) Continuation of application No. 16/787,671, filed on Feb. 11, 2020, now Pat. No. 11,259,227.

(51) Int. Cl.
*H04W 4/00* (2018.01)
*H04W 36/08* (2009.01)
*H04W 36/00* (2009.01)
*H04W 74/08* (2009.01)
*H04W 8/24* (2009.01)

(52) U.S. Cl.
CPC .............. *H04W 36/08* (2013.01); *H04W 8/24* (2013.01); *H04W 36/0085* (2018.08); *H04W 74/0833* (2013.01)

(58) Field of Classification Search
CPC ... H04W 36/08; H04W 36/0085; H04W 8/24; H04W 74/0833
See application file for complete search history.

(56) References Cited

U.S. PATENT DOCUMENTS

| | | | |
|---|---|---|---|
| 8,111,639 B2 | 2/2012 | Imamura et al. | |
| 11,259,227 B1* | 2/2022 | Sitaram | H04W 36/00835 |
| 2008/0287129 A1 | 11/2008 | Somasundaram et al. | |
| 2015/0087315 A1 | 3/2015 | Lu et al. | |
| 2018/0152904 A1 | 5/2018 | Xirouchakis et al. | |
| 2019/0090272 A1 | 3/2019 | Lee et al. | |
| 2020/0252967 A1 | 8/2020 | Ozturk et al. | |

* cited by examiner

*Primary Examiner* — Justin Y Lee
(74) *Attorney, Agent, or Firm* — Jones Robb, PLLC (57) ABSTRACT

Performing handovers based on RACH capabilities includes instructing neighboring access nodes to share RACH capabilities with each other, identifying a RACH capability of wireless devices attached to a serving access node, and selecting a target access node based on matching the RACH capabilities. The RACH capabilities are associated with a format and/or a range or distance of RACH transmissions.

20 Claims, 5 Drawing Sheets

COMPARE RACH CAPABILITY OF WIRELESS DEVICE WITH RACH CAPABILITY OF NEIGHBORING ACCESS NODES
410

↓

SELECT A TARGET ACCESS NODE BASED ON THE COMPARISON AND PERFORM HANDOVER
420

HANDOVERS BASED ON RACH CAPABILITIES

This patent application is a continuation of U.S. patent application Ser. No. 16/787,671, filed on Feb. 11, 2020, which is incorporated by reference in its entirety for all purposes.

TECHNICAL BACKGROUND

Wireless networks incorporating various different types of access nodes (including macrocell access nodes, mini-macro access nodes, small-cell access nodes, etc.) are becoming increasingly common. As a consequence, a wireless device attached to an access node may frequently switch to communicating with a different access node, depending on a location, transmit/receive signal strength, or resource requirement of the wireless device. Such switching between access nodes may be referred to as a "handover" to those having ordinary skill in the art.

Further, a wireless device attempting to establish communication with an access node typically sends a request for a communication channel to an access node using a random access procedure. A contention-based random access procedure is used when, for example, a wireless device is handed over from one access node to another access node, a wireless device exits an idle mode and attempts to re-establish communication with an access node, a wireless device temporarily loses communication with an access node and attempts to re-establish communication, data is available to be transmitted from the wireless device to the access node, etc. In a contention-based random access procedure, a wireless device typically sends a channel request over a randomly selected random access channel (RACH) or physical random access channel (PRACH). The channel request can comprise a random access preamble. When a channel request is received from the wireless device at an access node, the access node can provide a positive indication that access is permitted in a random access response. The positive indication may be in the form of a RACH response.

However, different types of access nodes and wireless devices have different RACH capabilities, which can complicate ability of a wireless device or wireless network to efficiently perform handovers. For example, different wireless devices (equipped with different circuitry or chipsets) are capable of transmitting RACH messages (e.g. preamble sequences) over different ranges (or distances). Similarly, different access nodes can be configured to transmit RACH messages (e.g. responses) over different ranges. Often, the overall coverage area of an access node is larger than the range for RACH messages transmitted therefrom, and as a consequence, wireless devices may attempt to attach to access nodes without being able to properly transmit and receive RACH messages. This can cause dropped connections during handovers (i.e. failed handovers), and repeated or unnecessary handovers, thereby wasting air-interface resources for signaling, and battery life of wireless devices.

Overview

Exemplary embodiments described herein include methods, systems, and processing nodes for performing handovers based on RACH capabilities. An exemplary method described herein includes comparing a RACH capability of a wireless device with a RACH capability of one or more neighboring access nodes and, based on the comparing, selecting a target access node from the one or more neighboring access nodes, wherein a handover is performed of the wireless device to the target access node.

An exemplary system described herein includes a processing node and a processor communicably coupled to the processing node. The processor is configured to perform operations including obtaining random access channel (RACH) capabilities of a wireless device attached to a serving access node and one or more neighboring access nodes communicably coupled to the serving access node, and identifying, based on the RACH capabilities, a target access node from the one or more neighboring access nodes, wherein a handover is performed of the wireless device to the target access node.

An exemplary processing node described herein is configured to perform operations including instructing a plurality of neighboring access nodes to share random access channel (RACH) capabilities with each other, identifying a RACH capability of a wireless device attached to a serving access node from among the plurality of neighboring access nodes, and selecting a target access node from among the plurality of neighboring access nodes based in part on matching the RACH capabilities of the wireless device with each neighboring access node, wherein a handover of the wireless device is performed to the target access node.

DETAILED DESCRIPTION

Exemplary embodiments described herein include methods, systems, and processing nodes configured for performing handovers of wireless devices to access nodes based on RACH capabilities of the wireless devices and the access nodes. A serving base station (i.e. access node) from among a plurality of neighboring base stations is able to match wireless devices attached to the serving access node with target base stations based on RACH capabilities of each base station and wireless device. The RACH capabilities can include a format or a distance/range corresponding to the format. For example, the wireless device can transmit its RACH capability to the serving base station, whereupon the serving base station generates a list of potential target access nodes having RACH distances that match the wireless device. A minimum range is determined between each base station and the wireless device, and the preferred target access node is determined based thereon.

For example, if the wireless device is capable of transmitting a RACH signal at 3 km, a neighboring macrocell access node is capable of transmitting a RACH signal at 5 km, and a neighboring mini-macro access node is capable of transmitting a RACH signal at 2 km, then the minimum range between the wireless device and the macrocell access node is 3 km (i.e. the range of the wireless device), and the minimum range between the wireless device and the mini-macro access node is 2 km (i.e. the range of the mini-macro access node). Then a highest minimum range is determined as the preferred target access node. In this case, the preferred target access node would be the macrocell access node. Thus, the wireless device can request a handover to the macrocell access node, assuming that all other signal levels required by the handover process are satisfied. These and other embodiments are further described with reference to FIGS. 1-6 below.

Figure 1:
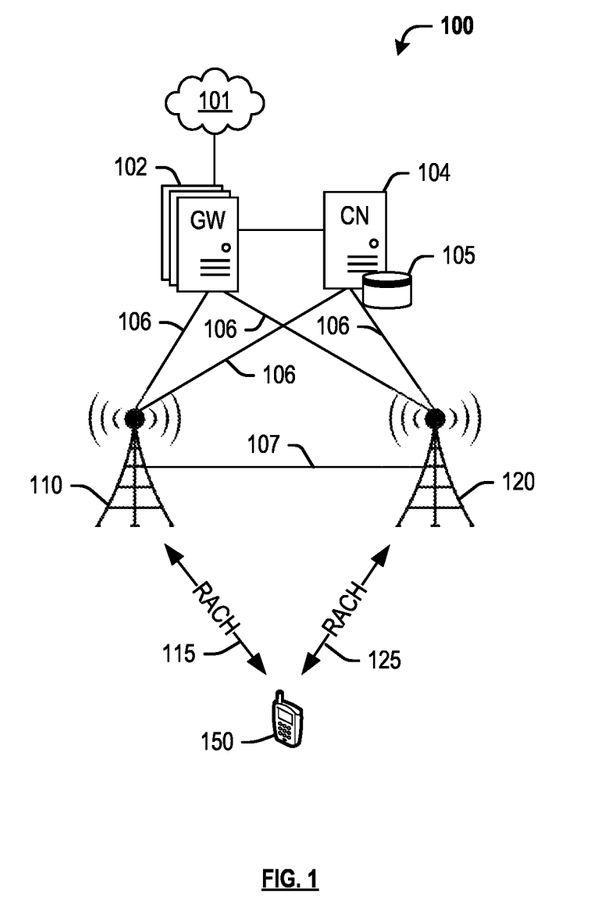
FIG. 1 depicts an exemplary system for performing handovers based on RACH capabilities.

FIG. 1 depicts an exemplary system for performing handovers based on RACH capabilities. System 100 comprises a communication network 101, gateway node(s) 102, controller node 104, access nodes 110 and 120, and wireless device 150. In this exemplary embodiment, access nodes 110, 120 may be macrocell access nodes, such as next generation or gigabit NodeBs (gNBs) in 5G networks, or enhanced eNodeBs (eNBs) in 4G/LTE networks. Alternatively, access nodes 110, 120 may be mini-macro access nodes, small-cell access nodes, femtocells such as home gNBs/eNBs, etc. Access nodes 110, 120 may communicate with each other through a direct connection 107 that comprises, for example, an X2 connection. Access nodes 110, 120 may further communicate with gateway node(s) 102 and controller node 104 via connections 106. Further, as described herein, wireless device 150 can attempt to establish communication with either access node 110 or 120 by initiating a random access procedure via a random access channel (RACH) or physical random access channel (PRACH). Such a message can include a random access preamble, and may be transmitted in a specific format, which is correlated with a range or distance of transmission. Further, when a channel request is received from the wireless device 150 at either access node 110, 120, the access node 110, 120 can provide a positive indication that access is permitted in a random access response. The positive indication may be in the form of a RACH response. Such a response can also be correlated with a range of distance of transmission, based on a capability or configuration of the access node.

As described above, the different capabilities of different types of access nodes and wireless devices can complicate ability of a wireless device or wireless network to efficiently perform handovers. Thus, either access node 110, 120, or a processing node communicatively coupled thereto, is configured to perform operations including comparing a RACH capability of the wireless device 150 with a RACH capability of each neighboring access node 110, 120 and, based on the comparing, selecting a target access node from the one or more neighboring access nodes 110, 120. The RACH capability includes at least a range at which each of the wireless device 150 and the one or more neighboring access nodes 110, 120 can transmit RACH messages, such as preambles, responses, etc. Thus, comparing the RACH capabilities can include comparing a first set of ranges associated with the wireless device 150 and the access node 110, and a second set of ranges associated with the wireless device 150 and the access node 120. A minimum range for RACH transmissions 115, 125 is identified. Identifying the minimum range can include determining which range is smaller. Subsequently, the target access node from between access node 110 and 120 is selected based on the largest minimum range.

For example, if the wireless device 150 is capable of transmitting a RACH signal at 3 km, access node 110 is capable of transmitting a RACH signal at 5 km, and access node 120 is capable of transmitting a RACH signal at 2 km, then the minimum range for transmissions 115 between the wireless device 150 and the access node 110 is 3 km (i.e. the range of the wireless device 150), and the minimum range for transmissions 125 between the wireless device 150 and the access node 120 is 2 km (i.e. the range of the access node 120). Then a highest minimum range is determined as the preferred target access node. In this case, the preferred target access node would be the access node 110, since range of transmissions 115 is greater than range of transmissions 125. Thus, the wireless device can request a handover to the access node 110, assuming that all other signal levels required by the handover process are satisfied.

Further, the RACH capability of each neighboring access node 110, 120 is received at a serving access node to which the wireless device is attached. For example, each neighboring access node 110, 120 can be instructed to share their respective RACH capability, periodically or on demand. Further, the RACH capability of the wireless device 150 is also received at the serving access node (either access node 110 or 120), and based on the comparison of RACH capabilities described above, a list of one or more preferred target access nodes is transmitted to the wireless device 150. The wireless device can request a handover to the target access node based on signal measurements. For example, as is known to those having ordinary skill in the art, the wireless device 150 can measure a receive strength (e.g. RSRP) or reference signals transmitted from each of the potential target access nodes. Further, the wireless device 150 can ignore reference signals from any access node that is not in the list of potential target access nodes as determined based on matching RACH capabilities.

In an exemplary embodiment, the RACH capability of each neighboring access node is associated with a type of access node. For example, a macrocell access node (such as an eNB or gNB) may be configured to utilize a RACH format that is able to traverse a long distance or range, whereas a mini-macro, small-cell, or femto-cell access node may be configured to utilize a different RACH format that is able to traverse a shorter distance or range. For example, different preamble formats using different frequency resources or encoded differently can be transmitted across different distances. Further, the hardware components (such as transceivers, antennae, etc.) can vary between wireless devices and access nodes. Thus, according to some embodiments, the target access node can be selected based on an association of the type of access node with the RACH capability of the wireless device 150.

Thus, in exemplary embodiments, system 100 is configured to perform handovers based on random access channel (RACH) capabilities by obtaining random access channel (RACH) capabilities of wireless device 150 attached to a serving access node from one among access nodes 110, 120, as well as RACH capabilities of each access node 110, 120, and identifying, based on the RACH capabilities, a target access node to which to handover the wireless device 150. Further, in another exemplary embodiment, a processing node within system 100 can be configured to perform handovers based on random access channel (RACH) capabilities by instructing a plurality of neighboring access nodes 110, 120 to share random access channel (RACH) capabilities with each other, identifying a RACH capability of wireless device 150 attached to one of the access nodes 110, 120, and selecting a target access node from among the plurality of neighboring access nodes 110, 120 based in part on matching the RACH capabilities of the wireless device 150 with each neighboring access node 110, 120.

Access nodes 110, 120 can be any network node configured to provide communication between wireless device 130 and communication network 101, including standard access nodes such as a macro-cell access node, base transceiver station, a radio base station, an eNodeB device, an enhanced eNodeB device, a gigabit NodeB (or gNodeB) in 5G New Radio ("5G NR"), or the like. For example, access nodes 110, 120 may implement 5G NR technologies to deploy a wireless radio air interface that supports frequency bands ranging from, e.g., 600 MHz to 100 GHz. In some embodiments, access nodes 110, 120 may deploy a radio air interface that supports frequency bands ranging from 2 GHz to 100 GHz. In some embodiments, access nodes 110, 120 may deploy a radio air interface that supports multiple frequency bands selected from 2 GHz to 100 GHz. In an exemplary embodiment, access nodes 110, 120 can have a coverage area in the range of approximately five kilometers to thirty-five kilometers and an output power in the tens of watts. Further, access nodes 110, 120 may comprise any short range, low power, small-cell access nodes such as a microcell access node, a picocell access node, a femtocell access node, or a home eNodeB device.

Access nodes 110 and 120 can each comprise a processor and associated circuitry to execute or direct the execution of computer-readable instructions to perform operations such as those further described herein. Briefly, access nodes 110 and 120 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110 and 120 can receive instructions and other input at a user interface. Access nodes 110, 120 communicate with gateway node(s) 102 and controller node 104 via communication links 106. Access nodes 110, 120 may communicate with each other, and other access nodes (not shown), using a direct communication link 107, such as an X2 link. Components of exemplary access nodes 110, 120 are further described with reference to FIG. 3.

Wireless device 150 may be any device, system, combination of devices, or other such communication platform capable of communicating wirelessly with access nodes 110, 120 using one or more frequency bands deployed therefrom. Wireless device 150 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. Other types of communication platforms are possible. Wireless device 150 (and other exemplary wireless devices described herein) may be configured with at least two transceivers. Each transceiver may be configured to communicate with a different access node. For example, each transceiver may be configured to attach to a wireless air interface deployed by a corresponding access node. Exemplary wireless devices described herein may be located within a radio range of said at least two access nodes, enabling the transceivers of the wireless devices to attach to the at least two access nodes. In an exemplary embodiment, the wireless device 150 comprises at least two transmitter modules and at least four receiver modules. In another exemplary embodiment, the first transceiver comprises at least one first transmitter module and at least two first receiver modules, and the second transceiver comprises at least one second transmitter module and at least two second receiver modules.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless device 150. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE). Wired network protocols that may be utilized by communication network 101 comprise Ethernet, Fast Ethernet, Gigabit Ethernet, Local Talk (such as Carrie Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106 can use various communication media, such as air, space, metal, optical fiber, or some other signal propagation path—including combinations thereof. Communication links 106 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), Long Term Evolution (LTE), 5G NR, or combinations thereof. Communication links 106 may include S1 communication links, X2 communications links, etc. Other wireless protocols can also be used. Communication links 106 can be a direct link or might include various equipment, intermediate components, systems, and networks. Communication links 106 may comprise many different signals sharing the same link.

Gateway node(s) 102 can be any network node configured to interface with other network nodes using various protocols. Gateway node(s) 102 can communicate user data over system 100. Gateway node(s) 102 can be standalone computing devices, computing systems, or network components, and can be accessible, for example, by a wired or wireless connection, or through an indirect connection such as through a computer network or communication network. For example, gateway node(s) 102 can include a serving gateway (S-GW) and/or a public data network gateway (P-GW), etc. One of ordinary skill in the art would recognize that gateway node(s) 102 are not limited to any specific technology architecture, such as Long Term Evolution (LTE) or 5G NR, and can be used with any network architecture and/or protocol.

Each of gateway node(s) 102 can comprise a processor and associated circuitry to execute or direct the execution of computer-readable instructions to obtain information. Gateway node(s) 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node(s) 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) or 5G NR, and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to elements within system 100, such as configurations and capabilities of access nodes 110, 120, wireless device 130, range information associated with RACH transmissions 115, 125, and any other information that enables performing handovers based on RACH capabilities as described herein. This information may be requested by or shared with gateway node(s) 102 and/or access nodes 110, 120 via communication links 106 and so on. The software comprises computer programs, firmware, or some other form of machine-readable instructions, and may include an operating system, utilities, drivers, network interfaces, applications, or some other type of software, and combinations thereof. For example, a processing node within controller node 104 can perform the operations described herein. Further, controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120 and communication network 101.

Further, the methods, systems, devices, networks, access nodes, and equipment described herein may be implemented with, contain, or be executed by one or more computer systems and/or processing nodes. The methods described herein may also be stored on a non-transitory computer readable medium. Many of the elements of system 100 may be, comprise, or include computers systems and/or processing nodes. This includes, but is not limited to: gateway node(s) 102, controller node 104, access nodes 110, 120, wireless device 150, and/or network 101.

Figure 2:
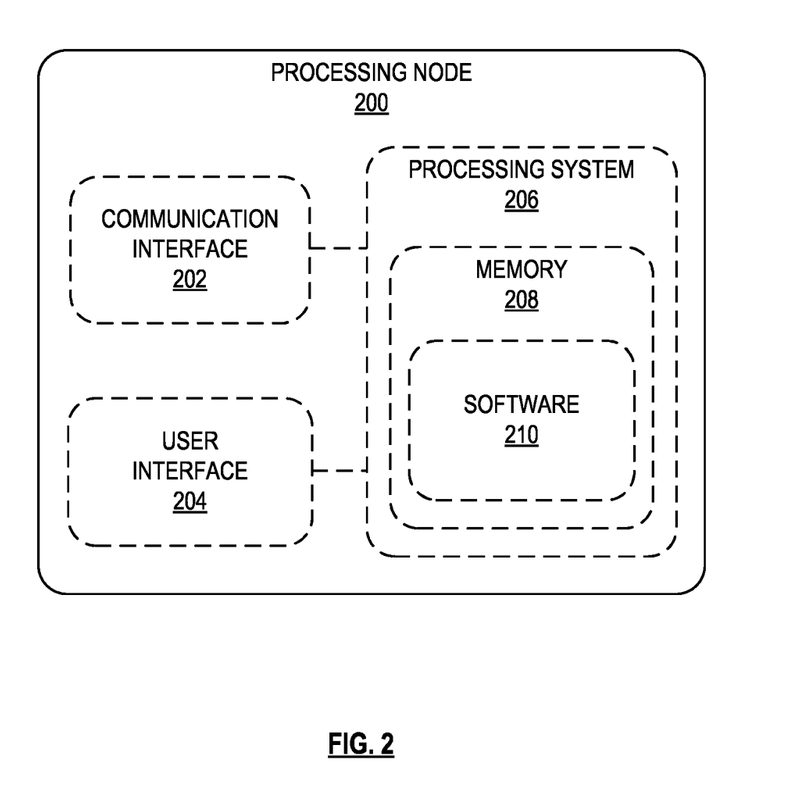
FIG. 2 depicts an exemplary processing node for performing handovers based on RACH capabilities.

FIG. 2 depicts an exemplary processing node for performing handovers based on RACH capabilities. Processing node 200 comprises a communication interface 202, user interface 204, and processing system 206 in communication with communication interface 202 and user interface 204. Processing system 206 includes storage 208, which can comprise a disk drive, flash drive, memory circuitry, or other memory device. Storage 208 can store software 210 which is used in the operation of the processing node 200. Storage 208 may include a disk drive, flash drive, data storage circuitry, or some other memory apparatus. For example, storage 208 may include a buffer. Software 210 may include computer programs, firmware, or some other form of machine-readable instructions, including an operating system, utilities, drivers, network interfaces, applications, or some other type of software. For example, software 210 may include a module for performing handovers and associated operations described herein. Processing system 206 may include a microprocessor and other circuitry to retrieve and execute software 210 from storage 208. Processing node 200 may further include other components such as a power management unit, a control interface unit, etc., which are omitted for clarity. Communication interface 202 permits processing node 200 to communicate with other network elements. User interface 204 permits the configuration and control of the operation of processing node 200.

In an exemplary embodiment, software 210 comprises instructions for comparing a RACH capability of a wireless device with a RACH capability of one or more neighboring access nodes and, based on the comparing, selecting a target access node from the one or more neighboring access nodes, wherein a handover is performed of the wireless device to the target access node. In another exemplary embodiment, software 210 comprises instructions for obtaining random access channel (RACH) capabilities of a wireless device attached to a serving access node and one or more neighboring access nodes communicably coupled to the serving access node, and identifying, based on the RACH capabilities, a target access node from the one or more neighboring access nodes, wherein a handover is performed of the wireless device to the target access node. In another exemplary embodiment, software 210 comprises instructions for instructing a plurality of neighboring access nodes to share random access channel (RACH) capabilities with each other, identifying a RACH capability of a wireless device attached to a serving access node from among the plurality of neighboring access nodes, and selecting a target access node from among the plurality of neighboring access nodes based in part on matching the RACH capabilities of the wireless device with each neighboring access node, wherein a handover of the wireless device is performed to the target access node.

Figure 3:
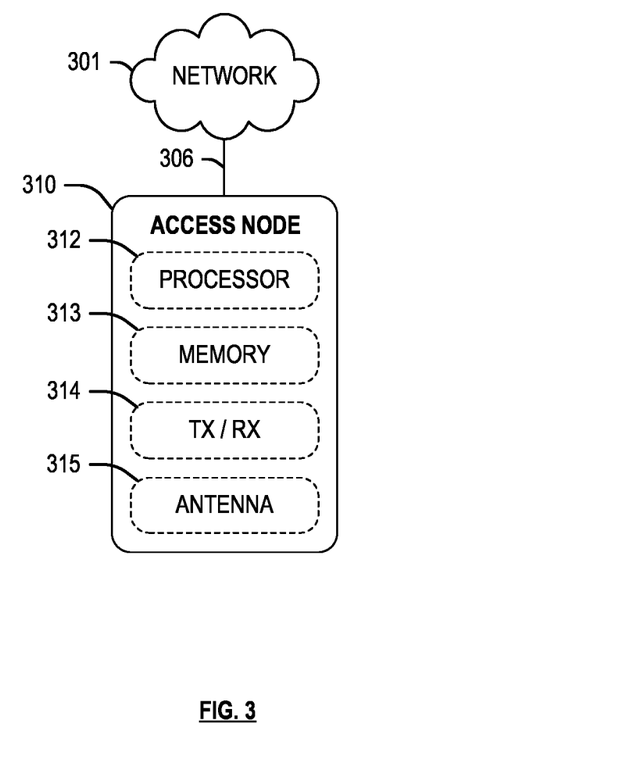
FIG. 3 depicts an exemplary access node for performing handovers based on RACH capabilities.

FIG. 3 depicts an exemplary access node 310. Access node 310 is configured as an access point for providing network services from network 301 to end-user wireless devices such as wireless device 150 in FIG. 1. Access node 310 is illustrated as comprising a memory 313 for storing logical modules that perform operations described herein, a processor 312 for executing the logical modules, and a transceiver 314 for transmitting and receiving signals via antennae 315. Combination of antennae 315 and transceiver 314 are configured to deploy a radio air interface in one or more sectors. Further, in each sector, the antennae 315 may be configured to operate in various operating modes (or transmit data in various transmission mode), such as MIMO (including SU-MIMO, MU-MIMO, and massive MIMO), beamforming, carrier aggregation, etc. Similarly, transceivers 314 include a plurality of transceivers that can deploy MIMO (and massive MIMO) data streams to end-user wireless devices using 4G, 5G, etc., as well as to facilitate communication with other network nodes on network 301. Further, access node 310 is communicatively coupled to network 301 via communication interface 306, which may be any wired or wireless link as described above.

In an exemplary embodiment, memory 313 includes logic for comparing a RACH capability of a wireless device with a RACH capability of one or more neighboring access nodes and, based on the comparing, selecting a target access node from the one or more neighboring access nodes, wherein a handover is performed of the wireless device to the target access node. In another exemplary embodiment, memory 313 includes logic for obtaining random access channel (RACH) capabilities of a wireless device attached to access node 310 and one or more neighboring access nodes communicably coupled to the serving access node, and identifying, based on the RACH capabilities, a target access node from the one or more neighboring access nodes, wherein a handover is performed of the wireless device to the target access node. In another exemplary embodiment, memory 313 includes logic for instructing a plurality of neighboring access nodes to share random access channel (RACH) capabilities with each other, identifying a RACH capability of a wireless device attached to access node 310, and selecting a target access node from among the plurality of neighboring access nodes based in part on matching the RACH capabilities of the wireless device with each neighboring access node, wherein a handover of the wireless device is performed to the target access node.

Figure 4:
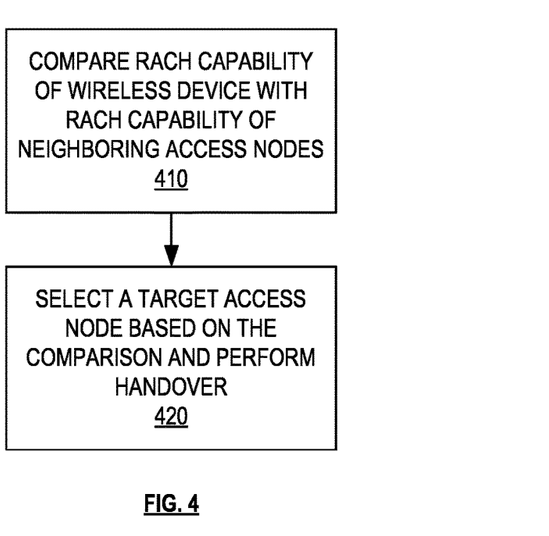
FIG. 4 depicts an exemplary method for performing handovers based on RACH capabilities.

FIG. 4 depicts an exemplary method for performing handovers based on RACH capabilities. The exemplary method of FIG. 4 may be implemented using components similar to those depicted in system 100, such as access nodes 110, 120, or wireless device 150. Although FIG. 4 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 410, a RACH capability of a wireless device is compared with a RACH capability of one or more neighboring access nodes. Generally, wireless devices establish communication with access nodes by initiating a random access procedure via a RACH or PRACH channel, transmitting a random access preamble or other RACH message in a specific format. Further, the access node can respond with a RACH response in a specific format. Since the different formats can be associated with different distances or ranges, comparing the RACH capabilities can include comparing a first range associated with the wireless device with one or more second ranges of each neighboring access node to determine the minimum ranges. Identifying the minimum range can include determining which range is smaller. For example, if the wireless device is capable of transmitting a RACH signal at 3 km, a first neighboring access node is capable of transmitting a RACH signal at 5 km, and a second neighboring access node is capable of transmitting a RACH signal at 2 km, then the minimum range for transmissions between the wireless device and the first neighboring access node is 3 km and the minimum range for transmissions between the wireless device and the second neighboring access node is 2 km.

Subsequently at 420, the highest possible minimum range is determined, and the target access node associated with the highest possibly minimum range is selected for a handover of the wireless device. from between access node 110 and 120 is selected based on the largest minimum range. For example, the first neighboring access node identified above would be the target access node since the range of transmissions of 3 km is greater than range of transmissions of 2 km. Thus, the wireless device can request a handover to the first neighboring access node, assuming that all other signal levels required by the handover process are satisfied. Further, a list of one or more preferred target access nodes can be transmitted to the wireless device. The wireless device can request a handover to the target access node based on signal measurements. For example, as is known to those having ordinary skill in the art, the wireless device can measure a receive strength (e.g. RSRP) or reference signals transmitted from each of the potential target access nodes. Further, the wireless device can ignore reference signals from any access node that is not in the list of potential target access nodes as determined based on matching RACH capabilities.

Figure 5:
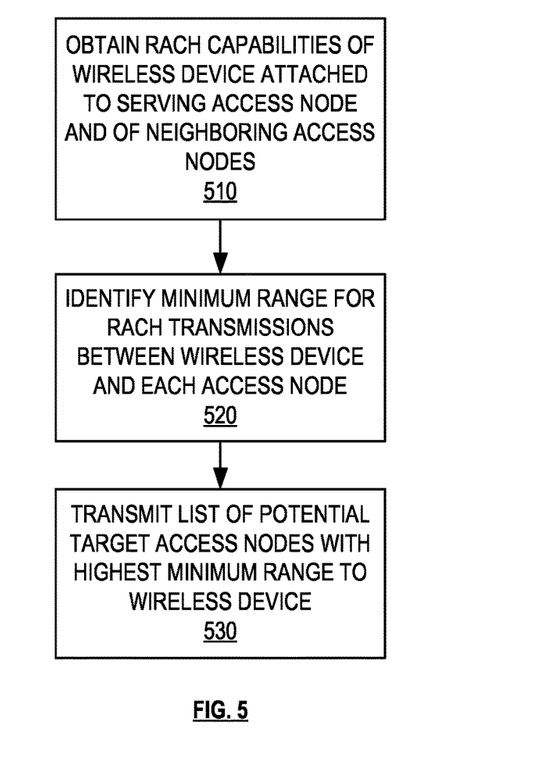
FIG. 5 depicts another exemplary method for performing handovers based on RACH capabilities.

FIG. 5 depicts an exemplary method for performing handovers based on RACH capabilities. The exemplary method of FIG. 5 may be implemented using components similar to those depicted in system 100, such as access nodes 110, 120, or wireless device 150. Although FIG. 5 depicts steps performed in a particular order for purposes of illustration and discussion, the operations discussed herein are not limited to any particular order or arrangement. One skilled in the art, using the disclosures provided herein, will appreciate that various features described herein can be omitted, rearranged, combined, and/or adapted in various ways.

At 510, a RACH capability of a wireless device attached to a serving access node is obtained along with RACH capabilities of one or more neighboring access nodes. The RACH capability of each neighboring access node may be received at a serving access node to which the wireless device is attached. For example, each neighboring access node can be instructed to share their respective RACH capability, periodically or on demand. The RACH capabilities can be associated with a distance or range of RACH transmissions. For example, a macrocell access node (such as an eNB or gNB) may be configured to utilize a RACH format that is able to traverse a long distance or range, whereas a mini-macro, small-cell, or femto-cell access node may be configured to utilize a different RACH format that is able to traverse a shorter distance or range. For example, different preamble formats using different frequency resources or encoded differently can be transmitted across different distances. Further, the hardware components (such as transceivers, antennae, etc.) can vary between wireless devices and access nodes.

Thus, the target access node can be selected based on an association of the type of access node with the RACH capability of the wireless device as performed at 510. Since different formats can be associated with different distances or ranges, comparing the RACH capabilities can include comparing a first range associated with the wireless device with one or more second ranges of each neighboring access node to determine the minimum ranges. Identifying the minimum range can include determining which range is smaller. For example, if the wireless device is capable of transmitting a RACH signal at 3 km, a first neighboring access node is capable of transmitting a RACH signal at 5 km, and a second neighboring access node is capable of transmitting a RACH signal at 2 km, then the minimum range for transmissions between the wireless device and the first neighboring access node is 3 km and the minimum range for transmissions between the wireless device and the second neighboring access node is 2 km.

Subsequently at 530, a list of potential target access nodes with a highest minimum range is transmitted to the wireless device. Thus, the wireless device can request a handover to the first neighboring access node, assuming that all other signal levels required by the handover process are satisfied. For example, the wireless device can measure a receive strength (e.g. RSRP) or reference signals transmitted from each of the potential target access nodes. Further, the wireless device can ignore reference signals from any access node that is not in the list of potential target access nodes as determined based on matching RACH capabilities.

Figure 6A:
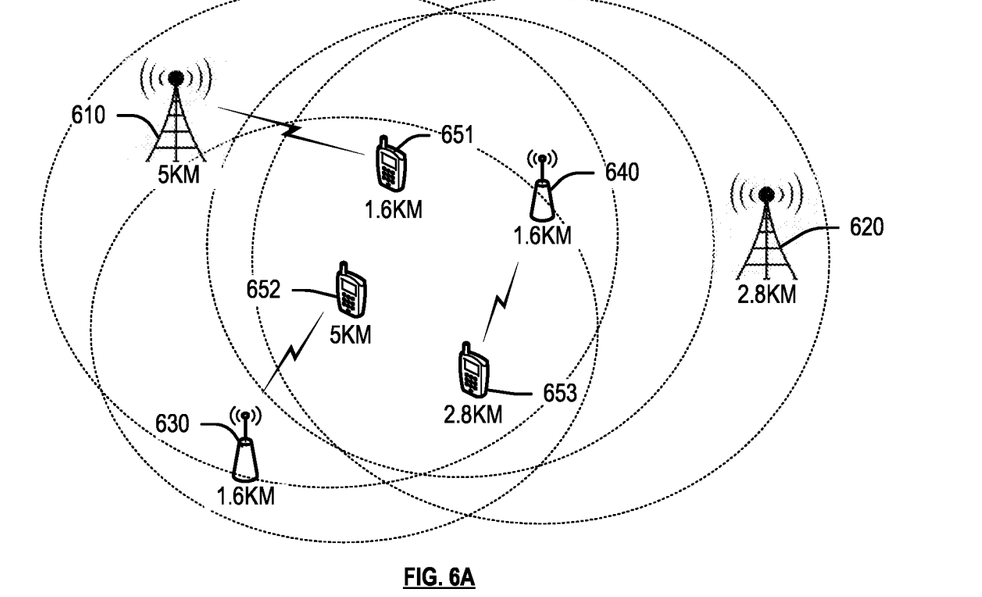
FIGS. 6A and 6B depict exemplary handovers being performed based on RACH capabilities of wireless devices and access nodes in a wireless network.
Figure 6B:
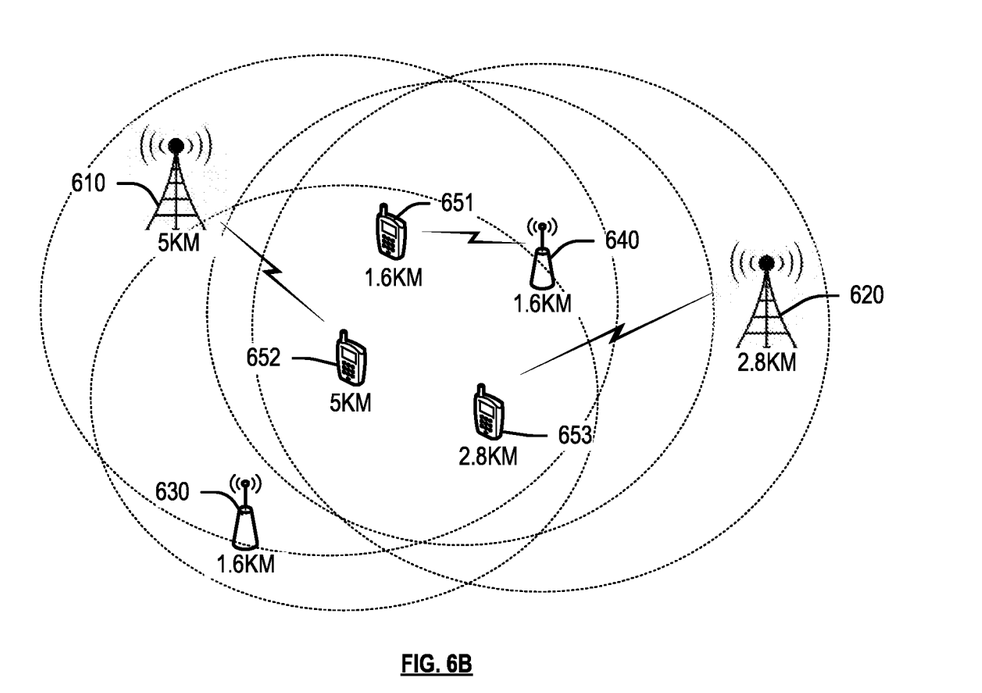

FIGS. 6A-6B illustrate exemplary handovers being performed in a wireless network based on the methods described above. Access nodes 610, 620, 630, and 640 are all neighboring access nodes, with overlapping coverage areas, and wireless devices 651, 652, and 653 are within the coverage areas of all access nodes 610, 620, 630, and 640. Further, access nodes 610 and 620 can include macrocell access nodes, similar to access nodes 110 and 120, and access nodes 630 and 640 can include small-cell, mini-macro, or femto-cell access nodes. Thus, as illustrated herein, access nodes 610 and 620 are capable of transmitting RACH messages up to 5 KM and 2.8 KM respectively, while access nodes 630 and 640 are capable of transmitting RACH messages up to 1.6 KM each. Further, each wireless device is configured with a different RACH capability. For example wireless device 651 is capable of transmitting RACH messages up to 1.6 KM, wireless device 652 is capable of transmitting RACH messages up to 5 KM, and wireless device 653 is capable of transmitting RACH messages up to 2.8 KM.

With reference to FIG. 6A, wireless device 651 is illustrated as being attached to macrocell access node 610. Thus, based on the operations described herein, macrocell access node 610 (in this case the serving access node) can receive RACH capabilities of wireless device 651 and each of access nodes 620, 630, 640, and determine an optimal target access node based on comparing the RACH capabilities. In this situation, a minimum RACH range between access node 620 and wireless device 651 would be 1.6 KM (i.e. the lesser of 2.8 KM and 1.6 KM). Similarly, the minimum RACH range between access node 630 and wireless device 651 is 1.6 KM, and the minimum RACH range between access node 640 and wireless device 651 is 1.6 KM. Thus, with all minimum ranges being equal, access node 610 may transmit identifiers of each access node 620, 630, and 640 as preferred access nodes to wireless device 651. Upon receipt of the list, wireless device 651 can select a target based on optimal signal measurements. For example, with reference to FIG. 6B, wireless device 651 is illustrated as being attached to access node 640.

Further in an exemplary embodiment, a target access node may be determined based on a minimum absolute difference between the RACH capability of the wireless device and the target access node. For example, the difference between the RACH capability of the wireless device 651 and the RACH capability of access node 640 is 0, while the difference between RACH capabilities of wireless device 651 and any other access node is greater than (or less than) zero. Thus, access node 640 is selected as the preferred target access node.

With reference again to FIG. 6A, wireless device 652 is illustrated as being attached to small-cell access node 630. Thus, based on the operations described herein, small-cell access node 630 (now the serving access node) can receive RACH capabilities of wireless device 652 and each of access nodes 610, 620, 640, and determine an optimal target access node based on comparing the RACH capabilities. In this situation, a minimum RACH range between access node 610 and wireless device 652 would be 5 KM, the minimum RACH range between access node 620 and wireless device 652 is 2.8 KM, and the minimum RACH range between access node 640 and wireless device 652 is 1.6 KM. Thus, access node 610 is the preferred target access node, and an identifier of access node 610 is transmitted to wireless device 652, upon receipt of which wireless device 652 can request a handover to access node 610. For example, with reference to FIG. 6B, wireless device 652 is illustrated as being attached to access node 610.

With reference again to FIG. 6A, wireless device 653 is illustrated as being attached to small-cell access node 640. Thus, based on the operations described herein, small-cell access node 640 (now the serving access node) can receive RACH capabilities of wireless device 653 and each of access nodes 610, 620, 630, and determine an optimal target access node based on comparing the RACH capabilities. In this situation, a minimum RACH range between access node 610 and wireless device 653 would be 2.8 KM, the minimum RACH range between access node 620 and wireless device 653 is 2.8 KM, and the minimum RACH range between access node 630 and wireless device 653 is 1.6 KM. Thus, access nodes 610 and 620 are potential target access nodes, and identifiers of these access nodes are transmitted to wireless device 653. Upon receipt of the identifiers, wireless device 653 can select a target based on optimal signal measurements. For example, with reference to FIG. 6B, wireless device 653 is illustrated as being attached to access node 620.

Further in an exemplary embodiment, a target access node may be determined based on a minimum absolute difference between the RACH capability of the wireless device and the target access node. For example, the difference between the RACH capability of the wireless device 653 and the RACH capability of access node 620 is 0, while the difference between RACH capabilities of wireless device 653 and any other access node is greater than (or less than) zero. Thus, access node 620 is selected as the preferred target access node.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for performing handovers based on random access channel (RACH) capabilities, the method comprising:
   comparing a RACH capability of a wireless device with a RACH capability of one or more neighboring access nodes, wherein the RACH capability of each neighboring access node is associated with a type of access node; and
   based on the comparing, selecting a target access node from the one or more neighboring access nodes,
   wherein a handover is performed of the wireless device to the target access node.

2. The method of claim 1, wherein the RACH capability includes a range at which each of the wireless device and the one or more neighboring access nodes can transmit RACH messages in a predetermined RACH format.

3. The method of claim 2, wherein the comparing comprises:
   comparing a first range associated with the wireless device and a second range of each neighboring access node; and
   identifying a minimum range for RACH transmissions between the wireless device and each neighboring access node.

4. The method of claim 3, wherein selecting the target access node is based on the largest minimum range.

5. The method of claim 1, wherein the RACH capability of each neighboring access node is received at a serving access node to which the wireless device is attached.

6. The method of claim 1, further comprising:
   receiving the RACH capability of the wireless device; and
   transmitting a list of one or more preferred target access nodes to the wireless device,
   wherein the wireless device requests a handover to the target access node based on signal measurements.

7. The method of claim 1, wherein the type of access node is one of a macrocell access node, a mini-macro access node, a small-cell access node, or a femto-cell access node.

8. The method of claim 1, further comprising selecting the target access node based on an association of the type of access node with the RACH capability of the wireless device.

9. A system for performing handovers based on random access channel (RACH) capabilities, the system comprising:
   a processing node; and
   a processor communicably coupled to the processing node, the processor being configured to perform operations comprising:
   obtaining random access channel (RACH) capabilities of a wireless device attached to a serving access node and one or more neighboring access nodes communicably coupled to the serving access node, wherein the RACH capability of each neighboring access node is associated with a type of access node; and
   identifying, based on the RACH capabilities, a target access node from the one or more neighboring access nodes,
   wherein a handover is performed of the wireless device to the target access node.

10. The system of claim 9, wherein the RACH capabilities include ranges at which each of the wireless device and the one or more neighboring access nodes can transmit RACH messages in a predetermined RACH format.

11. The system of claim 10, wherein the operations further comprise:
    comparing a first range associated with the wireless device and a second range of each neighboring access node; and
    identifying a minimum range for RACH transmissions between the wireless device and each neighboring access node.

12. The system of claim 11, wherein identifying the target access node is based on determining a highest minimum range for RACH transmissions between the wireless device and the target access node.

13. The system of claim 12, wherein a plurality of target access nodes are identified and a list of the plurality of target access nodes is transmitted to the wireless device.

14. The system of claim 9, wherein the RACH capability of each neighboring access node is received at the serving access node.

15. The system of claim 14, wherein the operations further comprise instructing each neighboring access node to share their respective RACH capability with each other and the serving access node.

16. The system of claim 9, wherein the type of access node is one of a macrocell access node, a mini-macro access node, a small-cell access node, or a femto-cell access node.

17. A processing node for performing handovers based on random access channel (RACH) capabilities, the processing node being configured to perform operations comprising:
    instructing a plurality of neighboring access nodes to share random access channel (RACH) capabilities with each other;
    identifying a RACH capability of a wireless device attached to a serving access node from among the plurality of neighboring access nodes; and
    selecting a target access node from among the plurality of neighboring access nodes based in part on matching the RACH capabilities of the wireless device with each neighboring access node, wherein the RACH capability of each neighboring access node is associated with a type of access node,
    wherein a handover of the wireless device is performed to the target access node.

18. The processing node of claim 17, wherein the RACH capabilities include ranges at which each of the wireless device and the plurality of neighboring access nodes can transmit RACH messages in a predetermined RACH format.

19. The processing node of claim 18, wherein selecting the target access node further comprises:

determining a minimum possible range of transmission of RACH messages between the wireless device and each access node; and identifying a largest minimum possible range.

20. The processing node of claim 17, wherein the operations further comprise transmitting an identifier of one or more target access nodes to the wireless device, wherein the wireless device requests a handover of the target access node based on signal measurements.

* * * * *